US012523365B2

(12) United States Patent
Leonardo et al.

(10) Patent No.: US 12,523,365 B2
(45) Date of Patent: Jan. 13, 2026

(54) HYBRID WIRELESS CONTROL SYSTEM USED WITH TRACKS SYSTEM

(71) Applicant: Lighting Services, Inc., Stony Point, NY (US)

(72) Inventors: Brian Joseph Leonardo, Verona, NJ (US); Nicholas Matthew Downham, Stony Point, NY (US); Joseph Anthony Taddeo, Marlboro, NY (US)

(73) Assignee: Lighting Services, Inc., Stony Point, NY (US)

( * ) Notice: Subject to any disclaimer, the term of this patent is extended or adjusted under 35 U.S.C. 154(b) by 327 days.

(21) Appl. No.: 18/332,311

(22) Filed: Jun. 9, 2023

(65) Prior Publication Data

US 2024/0085009 A1 Mar. 14, 2024

Related U.S. Application Data

(60) Provisional application No. 63/404,698, filed on Sep. 8, 2022.

(51) Int. Cl.

*F21V 23/06* (2006.01)
*F21V 21/34* (2006.01)
*F21V 23/04* (2006.01)
*H01R 25/14* (2006.01)

(52) U.S. Cl.

CPC .............. *F21V 23/06* (2013.01); *F21V 21/34* (2013.01); *F21V 23/0435* (2013.01); *H01R 25/142* (2013.01)

(58) Field of Classification Search

CPC ...... H01R 9/2608; H01R 25/14; H01R 25/16; H01R 25/142; F21V 23/06
USPC .......................................... 439/121, 110, 115
See application file for complete search history.

(56) References Cited

U.S. PATENT DOCUMENTS 5,096,429 A * 3/1992 Fraser .................... H01R 25/14 439/115
6,296,498 B1 * 10/2001 Ross .................... H01R 25/145 439/115
7,438,566 B2 * 10/2008 Chen .................... H01R 25/145 439/115
7,462,035 B2 * 12/2008 Lee ...................... H01R 12/592 439/37
7,819,676 B1 * 10/2010 Cardoso ............... H02G 3/0431 439/115
8,888,512 B2 * 11/2014 Hoffmeister ......... H01R 25/142 439/121
9,146,020 B2 * 9/2015 Devlin ............... H05B 47/1965
10,050,449 B2 * 8/2018 Hall ........................ H05B 47/19
2017/0089529 A1 * 3/2017 Xu ..................... H05B 47/1965

* cited by examiner

*Primary Examiner* — Hae Moon Hyeon
(74) *Attorney, Agent, or Firm* — St. Onge Steward Johnston & Reens LLC; Stephen P. McNamara

(57) ABSTRACT

A track lighting system having power conductors and data conductors is provided with a wirelessly operated controller unit which is supplied with power from the power conductors and controlled by a remote transmitter. The controller unit supplies addressable controllable signals to the data conductors of the system for effecting individual control of a plurality of output devices. The new system eliminates the need in conventional systems for providing each of the plurality output devices with individual wireless receivers.

18 Claims, 11 Drawing Sheets

HYBRID WIRELESS CONTROL SYSTEM USED WITH TRACKS SYSTEM

FIELD OF THE INVENTION

This invention relates to systems for remotely controlling multiple lighting fixtures, and is directed more particularly to a hybrid system for wirelessly controlling such fixtures in a more simplified and more economical manner.

BACKGROUND OF THE INVENTION

Wireless systems for remotely controlling lighting fixtures are well known and have been in use for many years. One such system, which uses a Digital Multiplex (DMX) protocol, utilizes a wireless transmitter to send control signals to each of a plurality of controllable devices, such as lighting fixtures. Each of the controllable devices is provided with a wireless receiver operative to receive and respond to a signal intended for that specific device. Such systems are widely used in theatrical installations, where the controllable devices can be employed for lighting effects, sound effects and other actions, all remotely controllable by wireless transmissions to the individual devices. These systems, while effective, are relatively costly because of the requirement for providing each individual controllable device with a wireless receiver. The cost of the individual receivers may be on the order of $200.00 each.

SUMMARY OF THE INVENTION

The present invention relates to an improved system for wirelessly controlling multiple fixtures, using one or a limited number of wireless receivers. Our improved system incorporates a track lighting system of a known construction, such as the "CONTROL Track" product offered commercially by Lighting Services, Inc. of Stony Point, NY. The CONTROL Track incorporates a pair of power conductors on one internal side wall and three data conductors on the other internal side wall. These track systems can be set up to use one of several control protocols, such as 0-10v, Digital Addressable Lighting Interface (DALI), and DMX. The power conductors are hard wired to a power source, and historically the data conductors have been hard wired to a control source. In accordance with the invention, however, the track system is provided with a wireless receiver module, which can be located at any point on the track. The receiver module engages with the power conductors of the track for power input to the receiver and with the data conductors of the track for control output from the receiver. The control output from the receiver module can provide independent control of a plurality of individually addressable and controllable output devices that can be removably mounted and positioned anywhere along the track system.

For a better understanding of the invention reference can be to the accompanying drawings and to the following specification.

DETAILED DESCRIPTION OF THE INVENTION

Figure 1:
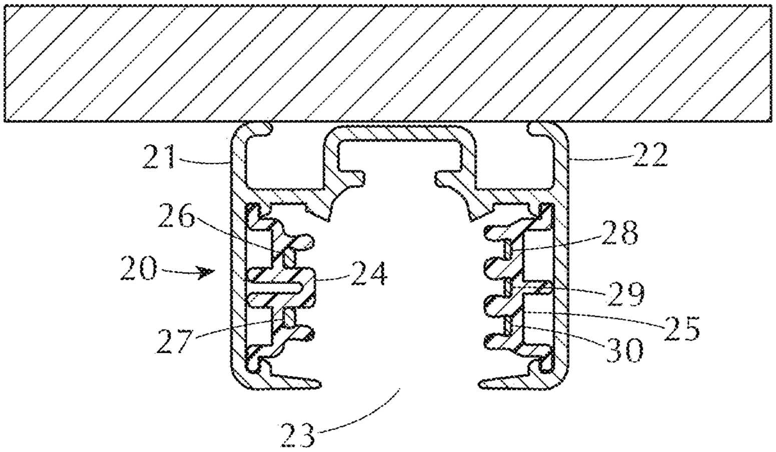
FIG. 1 (Prior Art)
FIGS. 1 and 2 are cross sectional views of track elements of a construction suitable for utilization in the system of the invention, FIG. 1 illustrating a surface-mounted track section and FIG. 2 illustrating a recessed track section.

Referring to the drawings, FIG. 1 shows cross sectional details of a typical track section 20 forming part of a track system, such as a CONTROL Track system offered commercially by Lighting Services, Inc. of Stony Point, NY. The section is an extrusion of aluminum and has vertical side walls 21, 22 and an open bottom 23. Insulators 24, 25, typically of plastic material, are secured to the interior of the track section 20 on the respective side walls 21, 22. The insulator 24 is provided with a pair of inwardly opening retaining grooves for the reception of power conductors 26, 27 exposed to the interior of the track section 20. The opposite side insulator 25 is provided with three inwardly opening grooves which receive data conductors 28-30 exposed to the interior of the track section. A plurality of the track sections can be assembled in various configurations, as is well known in the industry, with the power and data conductors being appropriately connected between adjacent track sections to provide power and data throughout the entire system.

Figure 2:
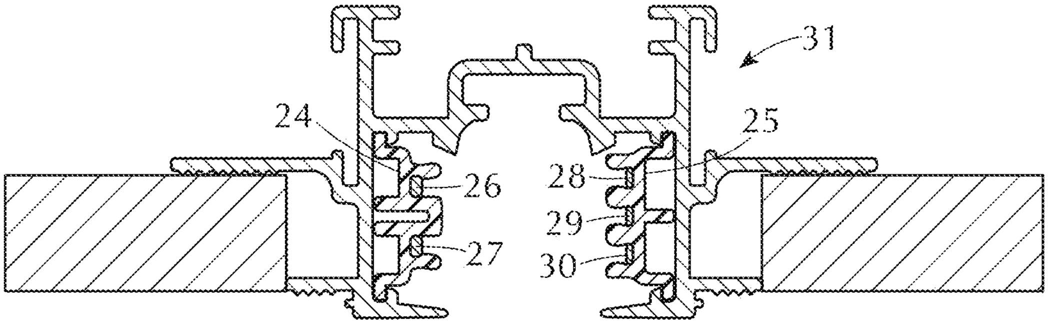
FIG. 2 (Prior Art)
Figure 3:
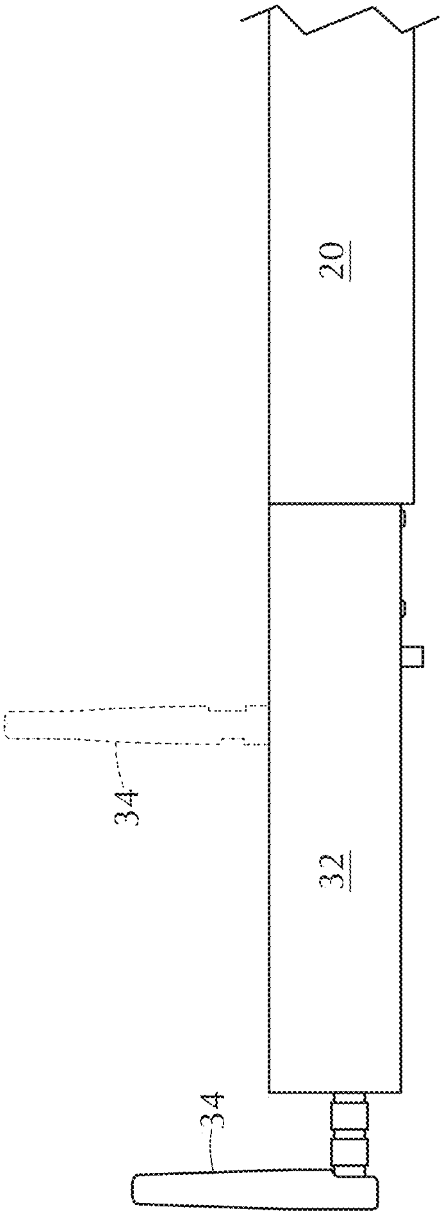
FIG. 3 is a side elevational view illustrating one end of a track section having an end feed module attached thereto containing a wireless receiver.
Figure 4:
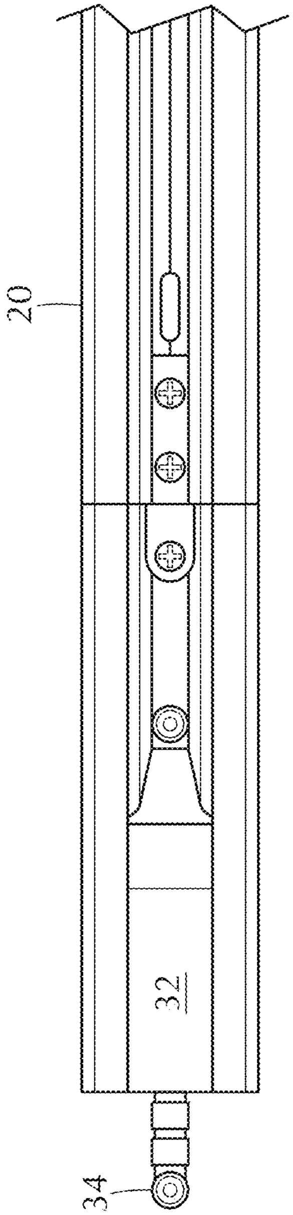
FIGS. 4 and 5 are a top plan and end views, respectively, of the assembled structure of FIG. 3.
Figure 5:
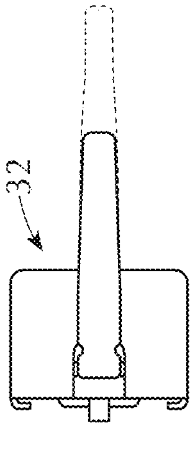
Figure 6:
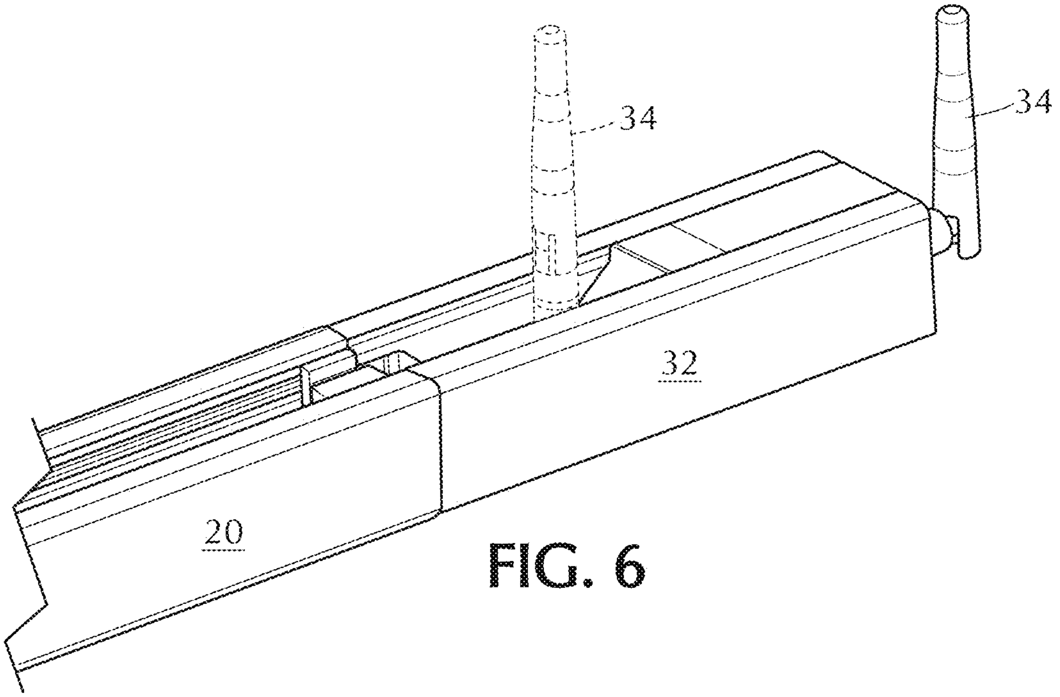
FIG. 6 is a top orthographic view of the structure of FIG. 3.
Figure 7:
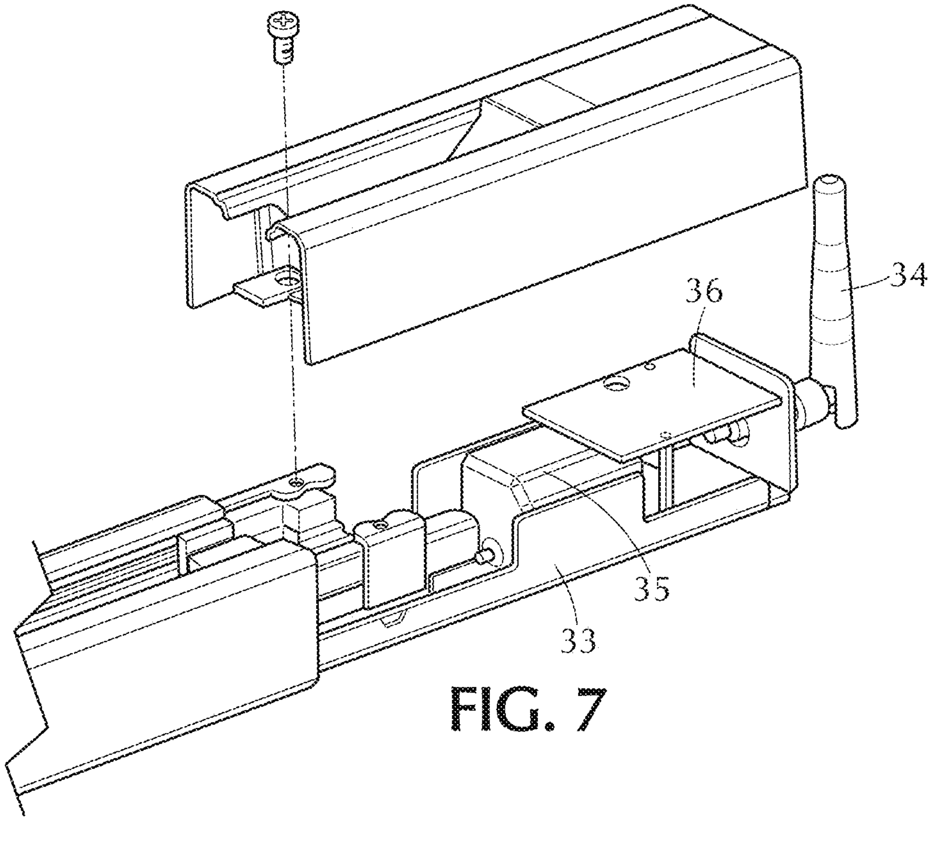
FIG. 7 is a top orthographic view, similar to FIG. 6, illustrating the end feed module with its cover removed.

The track section 31 of FIG. 2 is configured externally for recessed mounting in a ceiling or other overhead structure but otherwise corresponds functionally to the surface-mounted track section 20 of FIG. 1. Various functional elements of the track section 31 that correspond to the elements of the track section 20 will bear corresponding reference numerals.

FIGS. 3-7 illustrate one advantageous form of wireless receiver unit 32 for attachment at one end of a track section 20. The receiver unit 32 includes a main bracket 33 that mounts a directional antenna 34 and connects into the end of the track section. The bracket 33 mounts a power supply 35 and also a wireless receiver card 36 which is connected to the antenna 34 and serves in part to convert the wireless signal to data signals for output to the data conductors 28-30. The receiver unit 32 includes structure at one end for engaging and being supported by the adjacent track section 20 and for electrical engagement with the conductors 26-30 of the track section. The arrangement is such that the power supply 35 is supplied with power from the power conductors 26, 27, while the wireless receiver unit data output is supplied to the three data conductors 28-30 of the track system.

Figure 9:
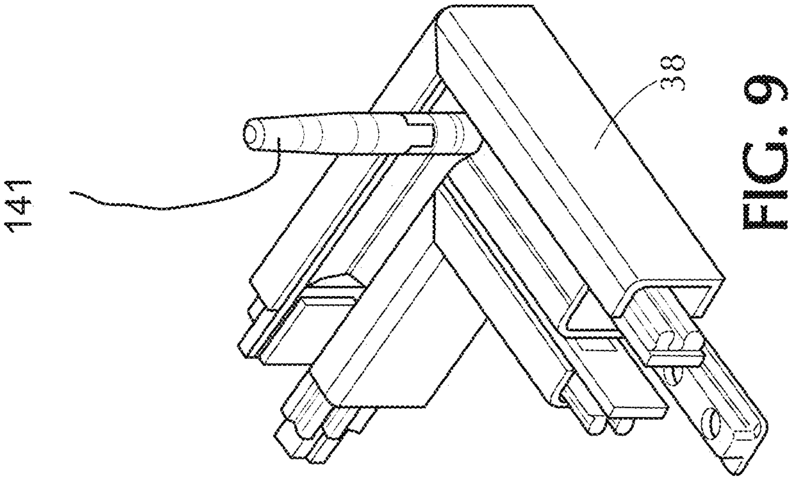
FIGS. 8-11 are top orthographic views of receiver modules for installation in a surface track system, illustrating straight, L-shaped, T-shaped and X-shaped modules, respectively.
Figure 8:
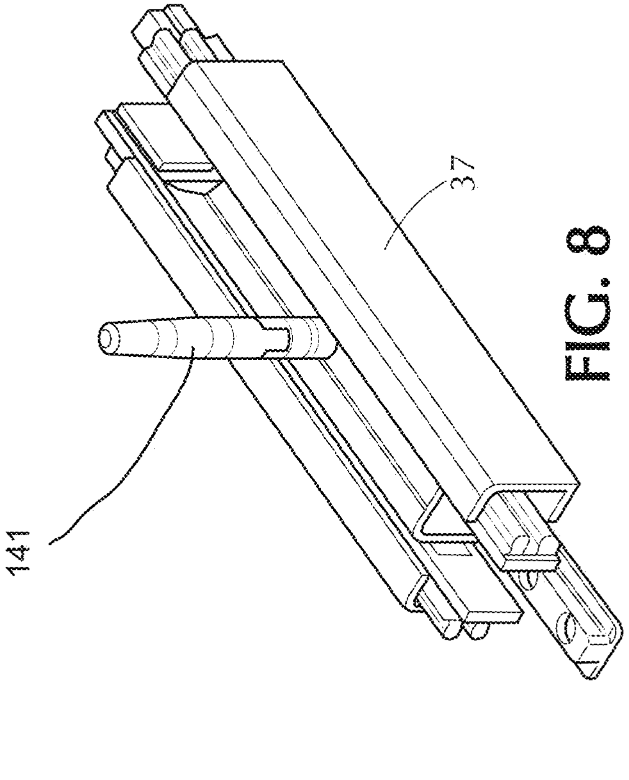
Figure 11:
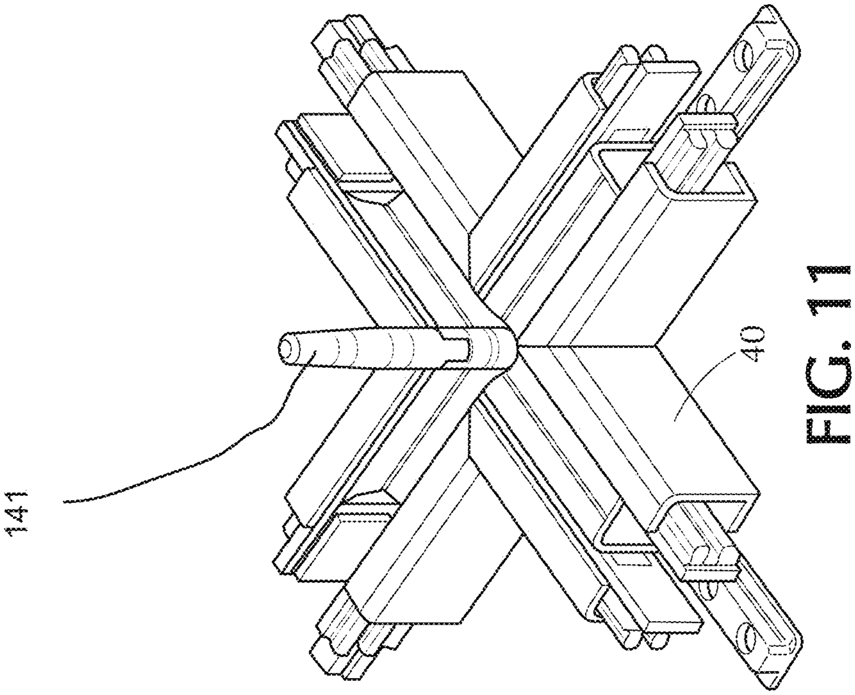
Figure 10:
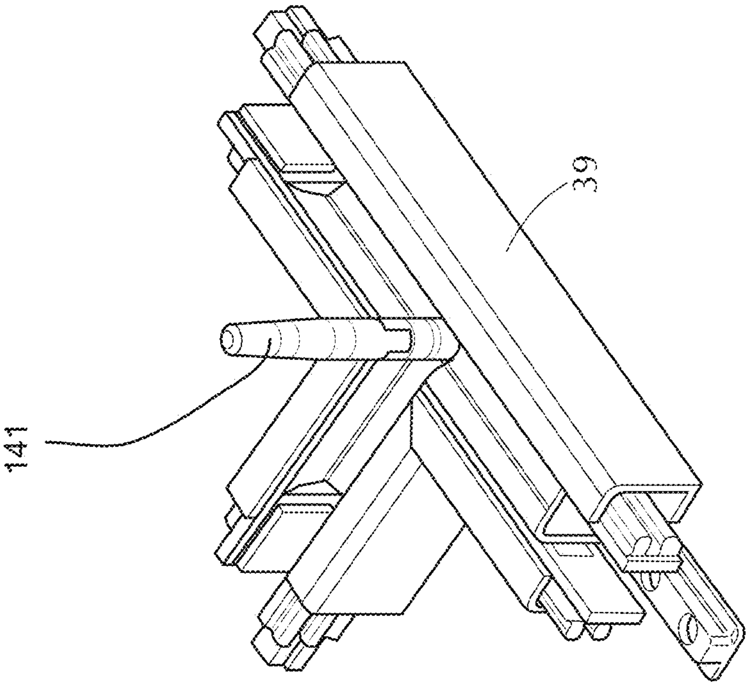

FIGS. 8-11 of the drawings illustrate various alternative forms of wireless receiver units for installation in a track system in accordance with the invention. Whereas the receiver unit 32 of FIGS. 3-7 is installed as an end member of a track configuration, FIGS. 8-11 illustrate wireless receivers 141 installed between track sections and serving as connectors thereof. In FIG. 8, the straight connector 37 is configured to connect between a pair of aligned track sections 20 (not shown), joining with the power and data conductors of each. FIG. 9 illustrates an L-shaped connector 38 for joining and electrically connecting with two track sections 20 (not shown) disposed at right angles. FIG. 10 illustrates a T-shaped connector 39 for joining and connecting with three track sections 20 (not shown) disposed in a T-shaped configuration. FIG. 11 illustrates a four-way, X-shaped connector 40 for joining and connecting with four track sections 20 (not shown) disposed in a right-angular connecting arrangement. In each of the connectors 37-40, the power and processing for the wireless receiver 141 advantageously are located within one of the two or more sections of the connector element, with power input to the wireless receiver 141 being provided by connections with power conductors 26, 27 (FIG. 1) of a track section and data output being provided by connections with data conductors 28-30 of a track section. Power can be input to the conductors 26, 27 at any suitable point in the track system. Data is input to the data conductors 28-30 by the wireless receiver unit and is conducted throughout the track system, with particular sets of data instructions being selectively addressed to individual output fittings at any and all locations along the track system.

Figure 13:
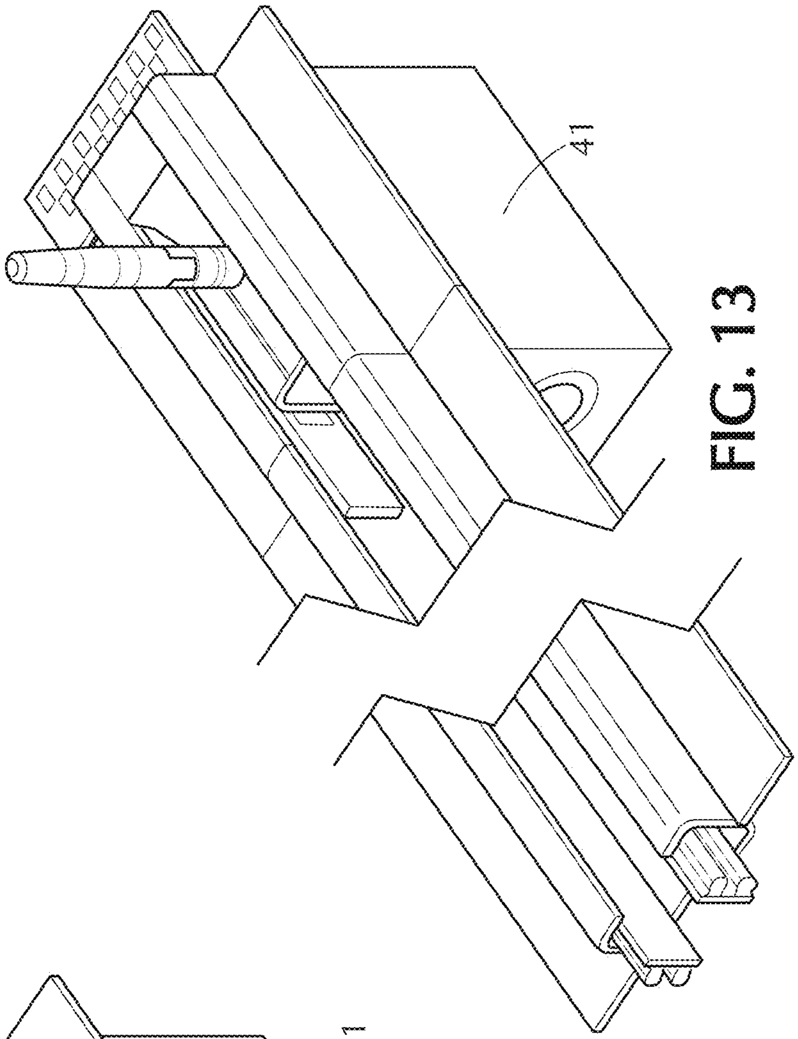
FIG. 13 is a top orthographic view of the module of FIG. 12 attached to a track section.
Figure 12:
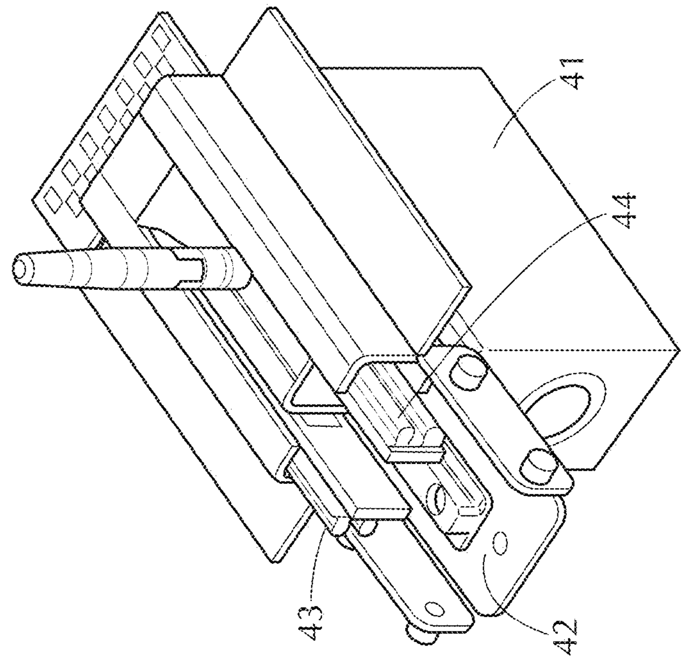
FIG. 12 is a top orthographic view of a wireless end module for mounting on a recessed track section.

FIGS. 12 and 13 illustrate an end section of recessed track 31 (FIG. 2) provided at an end thereof with a wireless receiver unit 41. The receiver unit 41 has a tongue structure 42, which can be attached to the track element 31, and power and data contacts 43, 44 that connect with the power and data contacts 26-27 and 28-30 of the track element 31. Because the track 31 is recessed, the body of the receiver unit 41 projects below the track element.

Figure 15:
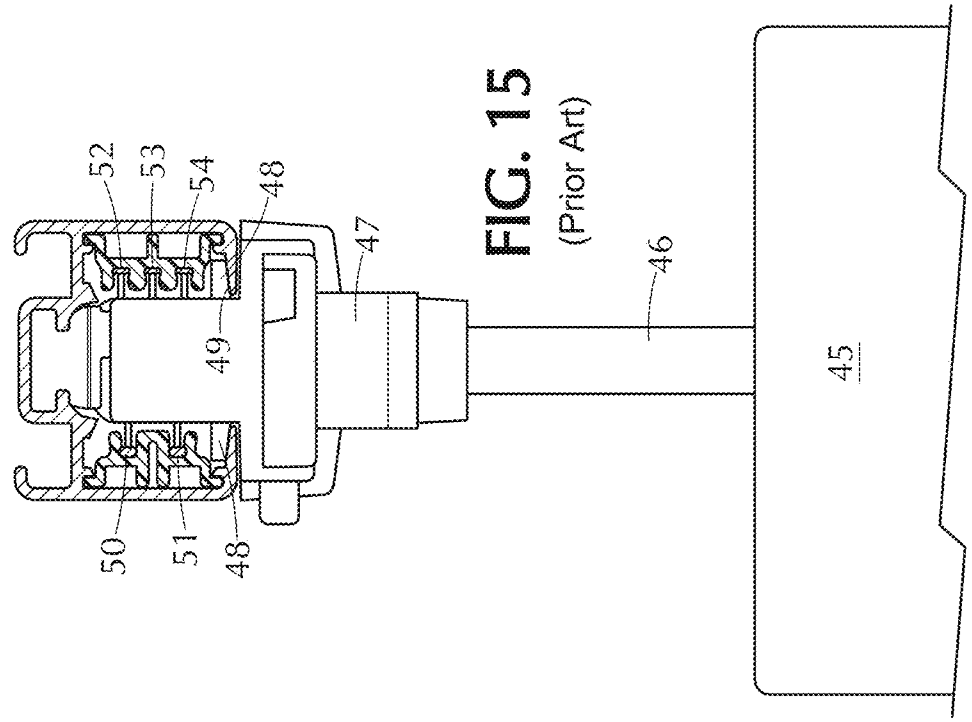
FIG. 15 (Prior Art)
FIG. 15 is an enlarged view of FIG. 14 illustrating details of the mounting and electrical connection of the output fixture to the track section.
Figure 14:
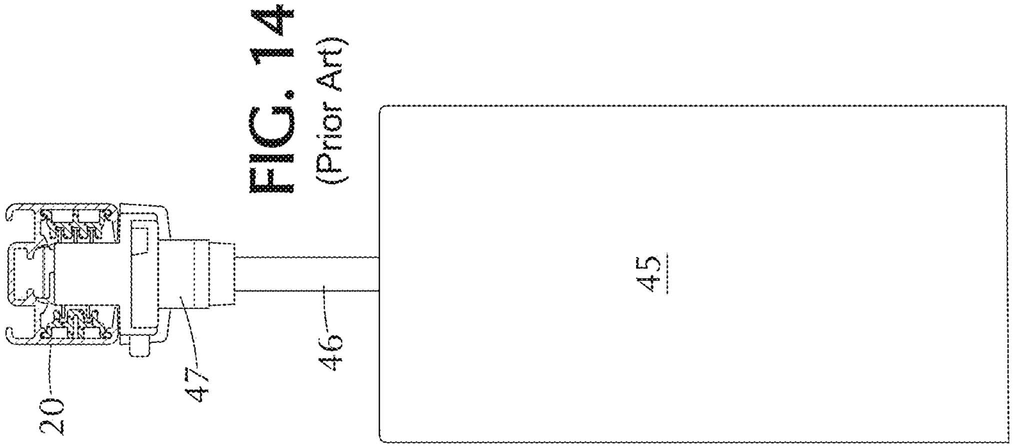
FIG. 14 (Prior Art)
FIG. 14 is a view of an output fixture mounted on a track section, with the latter shown in cross section.

FIGS. 14 and 15 illustrate the manner in which output fixtures, typically but not necessarily lighting fixtures, are operatively mounted to a track system of the type described above. A fixture body 45 is mounted on a vertical stem 46 provided at its upper end with a rotary mounting head 47. The mounting head 47 is provided on opposite sides with mounting wings 48 which fit between opposed support flanges 49 at the bottom of the track section, when the mounting head is rotated to an install/remove position and which overlie and are supported by the flanges 49 when the mounting head is rotated to a lock position, shown in FIGS. 15, 16. The rotary mounting head 47 also mounts rotary contact arms 50, 51 (power) and 52-54 (data), which project from opposite sides of the mounting head 47 and are aligned with the power and data conductors 26-27 and 28-30 when the fixture is mounted in a track section 20 or 31. Like the mounting wings 48, the contact arms 50-54 fit between the support flanges 49 when the mounting head 47 is rotated to an install/remove position. After insertion, the mounting head is rotated to bring the mounting wings into positions overlying and supported by the flanges 49, and simultaneously to bring the contact arms 50-54 into tight electrical contact with the respective power and data conductors.

Figure 16:
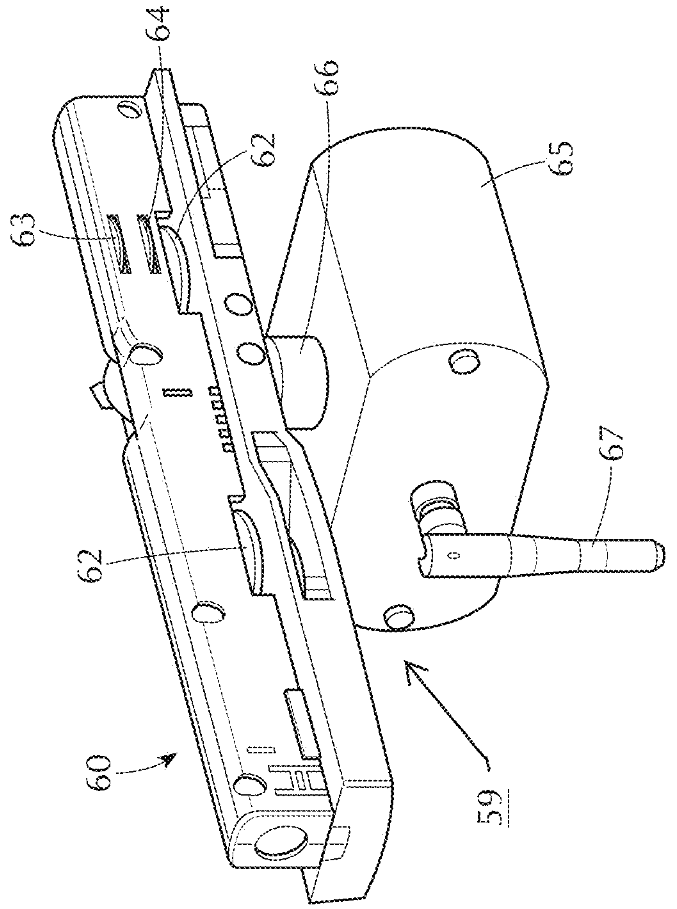
FIG. 16 is a top orthographic view of a "portable" form of wireless receiver module adapted to be mounted to a track lighting system in a wide variety of positions, similar to the manner in which output fixtures are mounted.
Figure 17:
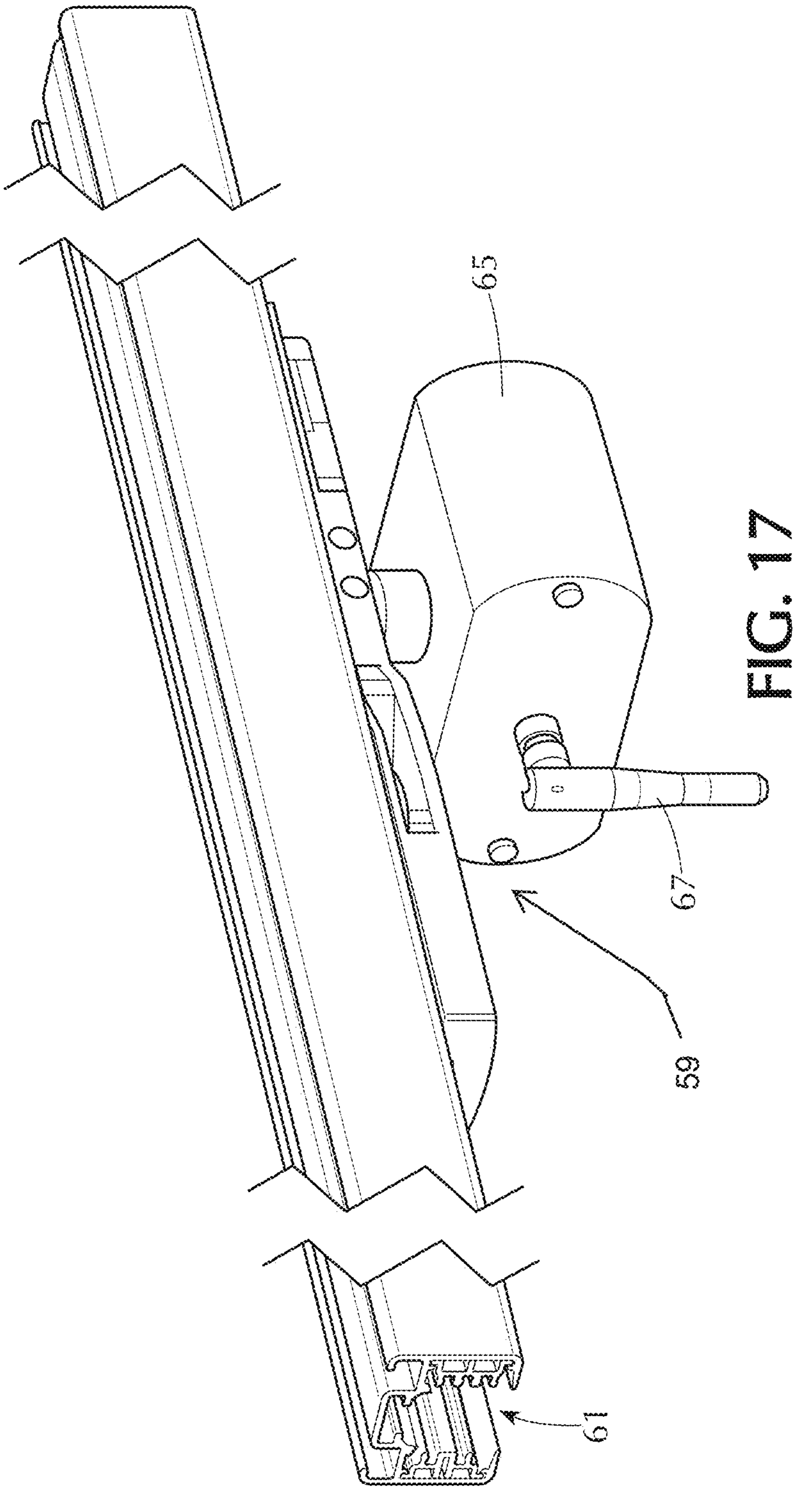
FIG. 17 illustrates the module of FIG. 16 mounted to a track section of a track lighting system.

In accordance with an aspect of the invention, the wireless receivers for receiving control data can be configured for "portable" mounting and location in the track system by installation in the track more or less in the same manner as a lighting or other output fixture. FIGS. 16 and 17 show one form of portable receiver 59 comprising an elongated mounting body 60 of inverted T-shaped cross section. The upwardly projecting "stem" portion of the T section is dimensioned to be received in the downwardly opening cavity 61 of a track section 20 or 31. The illustrated body 60 is somewhat elongated, compared to the output fixture sown in FIGS. 44, 45, and is provided with longitudinally spaced, rotatably mounted wing elements 62. The wing elements can be retracted within the body 60 for insertion into the track cavity 61, and thereafter rotated to extended positions to engage the flanges 49. Rotatably mounted contact elements, similar to the contact elements 50-54 of the fixture 45, are mounted for rotation with one of the wing elements 62. When the wing elements are rotated to extended positions, to engage the support flanges 49, the contact elements are also rotated into electrical contact with their respective power and data conductors 26, 27 and 28-30. A pair of rotatable power contacts 63, 64 are visible at the right hand side of the mounting body 60 in FIG. 16, it being understood that the rotatable data contacts are exposed on the opposite side of the mounting body 60.

Figure 18:
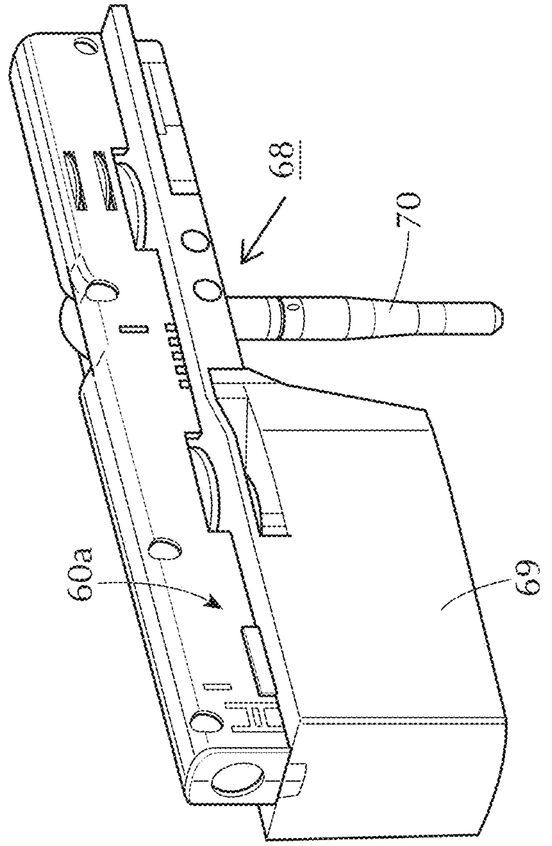
FIG. 18 illustrates an alternate form of "portable" receiver module adapted for mounting in various locations along a track system.

In the embodiment of FIGS. 16, 17 the electronics of the wireless receiver are contained within a housing 65 attached to the bottom of the mounting body by a short stem 66. A suitable directional antenna 67 is mounted on the housing 65. In the embodiment of FIG. 18, a portable receiver 68 includes a housing 69 for the receiver electronics which is mounted at one end of the mounting body 60*a*. The mounting body is functionally similar to the body 60. A directional receiving antenna 70 extends downward from the mounting body 60*a* and is connected to the receiver electronics in the housing 69.

The portable receivers 59, 68 can be quickly installed at any point in a track system and can be quickly removed and relocated to a new position as necessary or desirable, to accommodate a reconfiguration of fixtures on the track or for any other reason.

Figure 19:
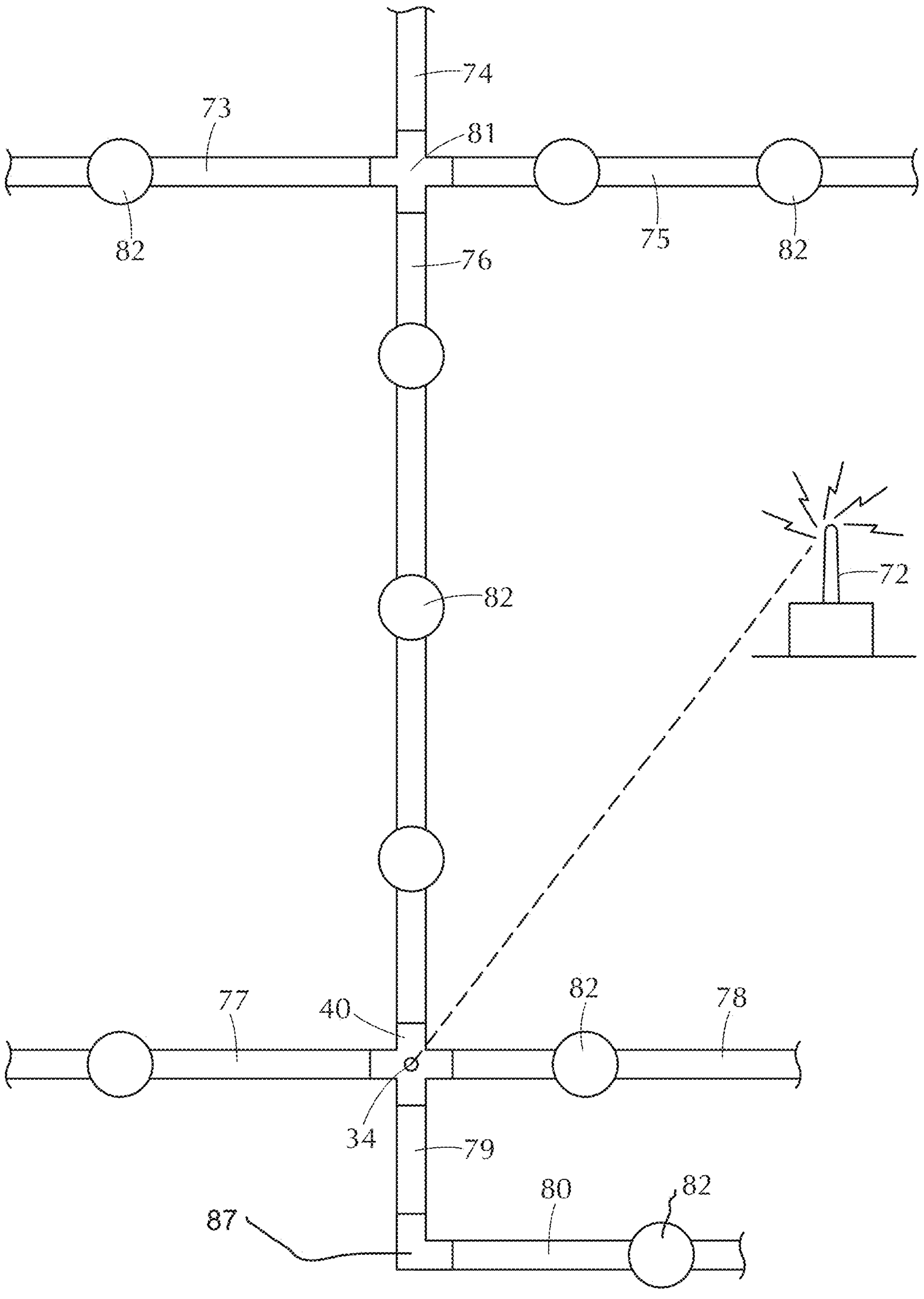
FIG. 19 is a schematic illustration of a track lighting system provided with a single receiver/control module independently controlling a plurality of track-mounted output fixtures.

FIG. 19 shows schematically a simple track system provided with a plurality of output fixtures wirelessly controllable using a single wireless receiver module associated with the track system and receiving control signals from a remote transmitter 72. The system of FIG. 19 comprises a plurality of straight track sections 73-80 arranged in a desired configuration according to the needs of the theatrical or other venue. The track sections 74-76 are joined at a common junction by a 4-way connector 81, which can be of a conventional type, provided with means for mechanically joining the four track sections as well as electrical connections for joining the power conductors 26, 27 and data conductors 28-30 of the several track sections. In the illustrated system, track sections 26-79 are joined by a four-way connector 40 (FIG. 11), which is provided with means for mechanically joining the track sections and electrically joining the respective power and data conductors 25, 26 and 28-30. The system of FIG. 19 also includes a standard L-shaped connector 87, mechanically and electrically joining sections 79 and 80 of straight track. In the illustrated system, the 4-way connector 40 is provided with a directional receiving antenna 34 for receiving control signals from the remote transmitter 72. As heretofore described, the received control signals are processed in the connector 40 and imparted to data conductors 28-30 of the track system for effecting the independent control of a plurality of output devices 82 mounted at various locations along the track system. The output devices 82 may be in the form of controllable lighting devices, sound making devices or other controllable devices desired by the venue.

The system of the invention has many and significant advantages over conventional systems for wirelessly control of a large number of output devices. Whereas conventional systems require each output device to be provided with its own wireless receiver, the inventive system enables a single wireless receiver to be installed in a track system, which may involve a large number of independently controlled output fixtures arranged in complex configurations. The single wireless receiver may be installed at any convenient point in the track system and may also be "portably" mounted, in the same manner as standard output fixtures. The portable features simplifies the initial installation and also accommodates convenient relocation of the receiver if necessary or desirable. The system of the invention, requiring only a single wireless receiver, not only greatly reduces the initial cost of the control system but correspondingly reduces maintenance requirements thereof.

In a system of unusual complexity, with an unusually large number of output devices, it may be preferred to utilize more than one receiving control device in the track system. In such a case, each receiving control device would address and control a separate group of the output devices with each group comprising a plurality of output devices. The data conductors of the system may be interrupted between the receiving control devices.

It should be understood that the specific embodiments of the invention herein illustrated and described are intended as representative only and do not define the limits of the invention. Reference should therefore be made to the following appended claims in determining the full scope of the invention.

The invention claimed is:

1. A track system for the mounting of a plurality of individually controllable output devices, said track system comprising:

a plurality of track sections and one or more connector sections for joining adjacent track sections, said track sections and connector sections being provided internally with power conductors and data conductors, the power conductors and data conductors being separated and electrically isolated from each other, said track sections being formed with a longitudinally extending opening along an exposed wall thereof adapted for the reception and mounting of the plurality of individually controllable output devices, where said plurality of individually controllable output devices have first electrical contacts engageable with said power conductors and second electrical contacts engageable with said data conductors, said track system including a wireless receiver connected with one of the track sections and having first contact elements connected to said power conductors, for receiving power therefrom, and second contact elements connected to said data conductors, for imparting data signals thereto, the plurality of individually controllable output devices being mounted on said track system and having first contact elements connected to said power conductors and second contact elements connected to said data conductors, said wireless receiver including an antenna for the wireless reception of control signals for the plurality of individually controllable output devices mounted on said track system, said wireless receiver transmitting said control signals for the individually controllable output devices via said data conductors to the plurality of individually controllable output devices mounted on said track system for independently addressable control of the plurality of individually controllable output devices on said track system.

2. The track system according to claim 1, wherein said wireless receiver is connected to an end of a track section and comprises an end member of a branch of track.

3. The track system according to claim 1, wherein said wireless receiver is configured in the form of an "L", or a "T", or an "X" for connecting 2, 3, or 4 track sections at an angle.

4. The track system according to claim 1, wherein said wireless receiver is removably and portably mountable at different points throughout the track system.

5. The track system according to claim 4, wherein said wireless receiver has a rotatable member insertable into the longitudinally extending opening in a track section, said rotatable member being provided with power contacts and data contacts and being rotatable to bring said contacts into engagement with power and data conductors in said track section.

6. The track system according to claim 5, wherein said longitudinally extending opening is in the bottom of said track section.

7. A track system for the mounting of a plurality of controllable output devices, said track system comprising:

one or more track sections and one or more connector sections for joining adjacent track sections, said track sections and connector sections being provided internally with power conductors and data conductors, the power conductors and data conductors being separated and electrically isolated from each other, said track sections being formed with longitudinally extending openings along an exposed wall thereof adapted for the reception and mounting of the plurality of controllable output devices, where said plurality of controllable output devices have first electrical contacts engageable with said power conductors and second electrical contacts engageable with said data conductors, said track system including a wireless receiver connected with one of the track sections and having first conductor elements connected to and receiving power from said power conductors and second conductor elements connected to and imparting control signals to said data conductors, said wireless receiver including an antenna for the wireless reception of control signals for the plurality of controllable output devices mounted on said track system, said wireless receiver transmitting said control signals for the plurality of controllable output devices via said data conductors to the plurality of controllable output devices mounted on said track system for independently addressable control of the plurality of controllable output devices on said track system.

8. The track system according to claim 7, wherein said wireless receiver comprises a connector joining two or more track sections.

9. The track system according to claim 7, wherein said wireless receiver comprises a portable member attachable to a track section and having rotatable contacts engageable respectively with said power conductors and said data conductors of said track section.

10. The track system according to claim 7, wherein said wireless receiver comprises an end member attached to an end of a track section.

11. The track system according to claim 7, wherein at least some of said plurality of controllable output devices are controllable lighting devices.

12. The track system according to claim 7, wherein at least some of said plurality of controllable output devices are sound-making devices.

13. A track system for the mounting of a plurality of controllable output devices, said track system comprising:

one or more track sections and one or more connector sections for joining adjacent track sections, the track sections and connector sections being provided internally with power conductors and data conductors, the power conductors and data conductors being separated and electrically isolated from each other, the track sections being formed with longitudinally extending openings along an exposed wall thereof;

a wireless receiver having an antenna for receiving wireless control signals mounted to one track section, said wireless receiver being in electrical connection with said data conductors and having an output via the data conductors of control signals based on the received wireless control signals; the wireless receiver having a rotatable member insertable into one longitudinally extending opening in the one track section to mount the wireless receiver to the one track section, said rotatable member having power contacts and data contacts and being rotatable to bring the power contacts into electrical connection with the power conductors in the track section and the data contacts into electrical connection with the data conductors in the track section;

the plurality of controllable output devices being mounted on said track system, the plurality of controllable output devices having a member insertable into the longitudinally extending opening in a track section, the plurality of controllable output devices having power contacts and data contacts, wherein the power contacts are in electrical connection with the power conductors in the track section and the data contacts are in electrical connection with the data conductors in the track section.

14. The track system according to claim 13, wherein said longitudinally extending opening is in the bottom of said track section.

15. The track system according to claim 13, wherein said wireless receiver is provided in a connector joining two or more track sections.

16. The track system according to claim 13, wherein said wireless receiver comprises a portable member removably attachable to a track section.

17. The track system according to claim 13, wherein at least some of said output devices are controllable lighting devices.

18. The track system according to claim 13, wherein at least some of said output devices are sound-making devices.

* * * * *